United States Patent
Nagai et al.

(10) Patent No.: US 11,535,782 B2
(45) Date of Patent: Dec. 27, 2022

(54) RESIN MEMBER AND SHEET USING SAME, AND HEAT STORAGE MATERIAL AND HEAT CONTROL SHEET USING SAME

(71) Applicant: HITACHI CHEMICAL COMPANY, LTD., Tokyo (JP)

(72) Inventors: Akira Nagai, Tokyo (JP); Tsuyoshi Morimoto, Tokyo (JP); Teiichi Inada, Tokyo (JP)

(73) Assignee: SHOWA DENKO MATERIALS CO., LTD., Tokyo (JP)

( * ) Notice: Subject to any disclaimer, the term of this patent is extended or adjusted under 35 U.S.C. 154(b) by 866 days.

(21) Appl. No.: 16/339,755

(22) PCT Filed: Oct. 7, 2016

(86) PCT No.: PCT/JP2016/079990
§ 371 (c)(1),
(2) Date: Apr. 5, 2019

(87) PCT Pub. No.: WO2018/066130
PCT Pub. Date: Apr. 12, 2018

(65) Prior Publication Data
US 2020/0048521 A1 Feb. 13, 2020

(51) Int. Cl.
| | |
|---|---|
| *C09K 5/06* | (2006.01) |
| *B32B 15/085* | (2006.01) |
| *B32B 15/20* | (2006.01) |
| *C08F 210/16* | (2006.01) |
| *C08K 5/01* | (2006.01) |
| *F28D 20/00* | (2006.01) |

(52) U.S. Cl.
CPC ............ *C09K 5/063* (2013.01); *B32B 15/085* (2013.01); *B32B 15/20* (2013.01); *C08F 210/16* (2013.01); *C08K 5/01* (2013.01); *F28D 20/0056* (2013.01)

(58) Field of Classification Search
CPC ....... C09K 5/063; C08F 210/16; B32B 15/20; B32B 15/085; F28D 20/0056; C08K 5/01
USPC .......................................................... 428/457
See application file for complete search history.

(56) References Cited

U.S. PATENT DOCUMENTS

| | | | | |
|---|---|---|---|---|
| 5,718,835 | A * | 2/1998 | Momose ................. | C09K 5/063 106/272 |
| 2015/0203734 | A1* | 7/2015 | Kanae ...................... | C08K 5/01 252/79 |

FOREIGN PATENT DOCUMENTS

| | | | |
|---|---|---|---|
| CN | 101225293 A | | 7/2008 |
| CN | 101486894 A | | 7/2009 |
| JP | H5-059352 A | | 3/1993 |
| JP | H6-065565 A | | 3/1994 |
| JP | H6-192647 A | | 7/1994 |
| JP | 07048561 | * | 2/1995 |
| JP | H7-048561 A | | 2/1995 |
| JP | 2001-349619 A | | 12/2001 |
| JP | 2014-095023 A | | 5/2014 |
| WO | 2011/078340 A1 | | 6/2011 |

* cited by examiner

*Primary Examiner* — Hui H Chin
(74) *Attorney, Agent, or Firm* — Fitch, Even, Tabin & Flannery, LLP

(57) ABSTRACT

In one aspect, the present invention provides a resin member comprising a copolymer of ethylene and an olefin having 3 or more carbon atoms, and a straight-chain saturated hydrocarbon compound.

8 Claims, 3 Drawing Sheets

RESIN MEMBER AND SHEET USING SAME, AND HEAT STORAGE MATERIAL AND HEAT CONTROL SHEET USING SAME

CROSS-REFERENCE TO RELATED APPLICATIONS

This application is a U.S. national phase application filed under 35 U.S.C. § 371 of International Application No. PCT/JP2016/079990, filed Oct. 7, 2016, designating the United States, which is hereby incorporated herein by reference in its entirety.

TECHNICAL FIELD

The present invention relates to a resin member and a sheet using same, and heat storage material and heat control sheet using same.

BACKGROUND ART

Conventionally, heat storage materials are provided for temporarily saving thermal energy in order to take out thermal energy from time to time in air conditioning equipment in automobiles, buildings, underground malls, automobile engines, electronic components, and the like.

An example of the heat storage material includes a material accumulating or dissipating heat by utilizing a phase transition of a substance. As such a heat storage material, for example, a material using hydrocarbon compounds is known. Hydrocarbon compounds have excellent heat storage properties by reversibly undergoing phase transition. However, since hydrocarbon compounds are in a liquid state on the high temperature side of the phase transition and may bleed out, some kind of bleeding prevention measures must be applied.

In response to such a problem, for example, Patent Literatures 1 and 2 disclose a heat storage material containing a hydrogenated diene-based copolymer as a heat storage material for suppressing bleeding of hydrocarbons.

CITATION LIST

Patent Literature

Patent Literature 1: International Publication No. WO 2011/078340
Patent Literature 2: Japanese Unexamined Patent Publication No. 2014-95023

SUMMARY OF INVENTION

Technical Problem

For example, the heat storage material may be used while is wound around an object in a pulled state. In such a case, the heat storage material is required to have sufficient strength (in particular, tensile strength). However, a heat storage material as disclosed in Patent Literatures 1 and 2 does not necessarily have a sufficient strength.

The present invention has been made in view of such circumstances, and an object of the present invention is to provide a resin member having an excellent strength, and a heat storage material. Another object of the present invention is to provide a sheet using the resin member and a thermal control sheet using the heat storage material.

Solution to Problem

In one aspect, the present invention is a resin member comprising a copolymer of ethylene and an olefin having 3 or more carbon atoms, and a straight-chain saturated hydrocarbon compound.

In another aspect, the present invention is a heat storage material comprising a copolymer of ethylene and an olefin having 3 or more carbon atoms, and a straight-chain saturated hydrocarbon compound.

In each of the above aspects, the number of carbon atoms of the olefin may be 3 to 8.

In each of the above aspects, when the melting point of the straight-chain saturated hydrocarbon compound is less than 50° C., the number of carbon atoms of the olefin is preferably 8.

In each of the above aspects, when the melting point of the straight-chain saturated hydrocarbon compound is 50° C. or more, the resin member preferably further comprises at least one selected from the group consisting of polyethylene and polypropylene.

In another aspect, the present invention is a sheet comprising a metal layer and a resin layer formed on the metal layer and composed of the above-described resin member.

In another aspect, the present invention is a heat control sheet comprising a metal layer and a heat storage layer formed on the metal layer and composed of the above-described heat storage material.

Advantageous Effects of Invention

The present invention can provide a resin member having an excellent strength and a heat storage material, and also can provide a sheet using the resin member and a heat control sheet using the heat storage material.

DESCRIPTION OF EMBODIMENTS

Hereinafter, embodiments of the present invention will be described in detail with reference to the drawings as appropriate.

Figure 1:
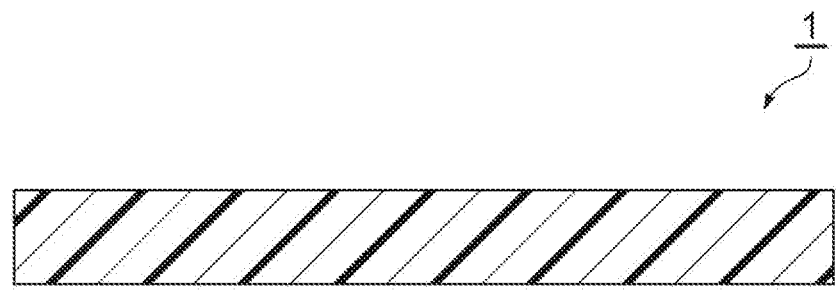
FIG. 1 is a schematic cross-sectional view showing one embodiment of a resin member.

FIG. 1 is a schematic cross-sectional view showing one embodiment of the resin member. In one embodiment, the resin member 1 includes a copolymer of ethylene and an olefin having 3 or more carbon atoms (hereinafter also referred to as "component (A)"), and a straight-chain saturated hydrocarbon compound (hereinafter referred to as "component (B)"). The resin member 1 may be, for example, in the form of a sheet (film).

The number of carbon atoms of the olefin constituting the copolymer (hereinafter also simply referred to as "olefin") is 3 or more and for example 3 to 8. When the olefin has 4 or more carbon atoms, the olefin may be linear or branched. Examples of a copolymer of ethylene and an olefin having 3 or more carbon atoms include a copolymer of ethylene and propylene (C3), a copolymer of ethylene and butene (C4), a copolymer of ethylene and pentene (C5), a copolymer of ethylene and hexene (C6), a copolymer of ethylene and heptene (C7), a copolymer of ethylene and octene (C8), a copolymer of ethylene and nonene (C9), and a copolymer of ethylene and decene (C10). The value in parentheses shown in the specific examples indicates the number of carbons. Of these copolymers, a copolymer of ethylene and an olefin having 3 to 8 carbon atoms is preferable to be used since easily available. A copolymer of ethylene and an olefin having 3 or more carbon atoms may be used alone or in combination of two or more.

The content of the component (A) is preferably 5% by mass or more, more preferably 10% by mass or more, and furthermore preferably 15% by mass or more based on the total amount of the resin member. The content of the component (A) is preferably 50% by mass or less, more preferably 40% by mass or less, and furthermore preferably 30% by mass or less based on the total amount of the resin member.

From the viewpoint of obtaining a heat storage effect within a practical range, the component (B) has a melting point within a range of 0 to 100° C., for example. The component (B) may be linear or branched. Specific examples of the component (B) include n-tetradecane (C14, 6° C.), n-pentadecane (C15, 9° C.), n-hexadecane (C16, 18° C.), n-heptadecane (C17, 21° C.), n-octadecane (C18, 28° C.), n-nanodecane (C19, 32° C.), n-eicosane (C20, 37° C.), n-heneicosane (C21, 41° C.), n-docosane (C22, 46° C.), n-tricosane (C23, 47° C.), n-tetracosane (C24, 50° C.), n-pentacosane (C25, 54° C.), n-hexacosane (C26, 56° C.), n-heptacosane (C27, 60° C.), n-octacosane (C28, 65° C.), n-nonacosane (C29, 66° C.), n-triacontane (C30, 67° C.), n-tetracontane (C40, 81° C.), n-pentacontane (C50, 91° C.), and n-hexacontane (C60, 98° C.). The values in parentheses shown in the specific examples indicates the number of carbons and the melting point, respectively. The above melting point is a temperature at the point where the baseline crosses the tangent line of the maximum slope of the melting (endothermic) peak of the thermogram obtained in heating at a temperature rising rate of 10° C./min by using a differential scanning calorimeter (for example, "8500" manufactured by Perkin Elmer).

The component (B) may be a petroleum wax containing a linear saturated hydrocarbon compound as a main component. The petroleum wax is a purified product from vacuum distillation components of petroleum or natural gas as a raw material. Specific examples of the petroleum wax include Paraffin Wax (48 to 69° C. (melting point, the same applies hereinafter)), HNP (64 to 77° C.), SP (60 to 74° C.), EMW (49° C.), and the like manufactured by Nippon Seiro Co., Ltd. These components (B) may be used alone or in combination of two or more.

The content of the component (B) is preferably 40% by mass or more, more preferably 45% by mass or more, and furthermore preferably 50% by mass or more based on the total amount of the resin member. The content of the component (B) is preferably 90% by mass or less, more preferably 80% by mass or less, and furthermore preferably 70% by mass or less based on the total amount of the resin member.

When the melting point of the straight-chain saturated hydrocarbon compound is less than 50° C., the number of carbon atoms of the olefin in the component (A) is preferably 8 from the viewpoint of superior suppression of fluidity of the straight-chain saturated hydrocarbon compound.

The resin member 1 may further contain a gelling agent (hereinafter also referred to as "component (C)"). The component (C) is not particularly limited as long as it is a component capable of gelling the component (B). The component (C) may be, for example, a carboxylic acid or a carboxylic acid metal salt. That is, in another embodiment, the resin member 1 includes at least one selected from the group consisting of a carboxylic acid and a carboxylic acid metal salt, in addition to the component (A) and the component (B).

A carboxylic acid in the component (C) is preferably a carboxylic acid having a straight-chain hydrocarbon group (straight-chain aliphatic carboxylic acid), from the viewpoint of good compatibility with the straight-chain saturated hydrocarbon compound. The number of carbon atoms of the carboxylic acid is preferably 10 or more, such as 10 to 40, 10 to 30, or 10 to 25. The carboxylic acid may be saturated or unsaturated. Examples of the carboxylic acid include, but are not limited to, lauric acid (C12 (number of carbon atoms, the same applies below)), myristic acid (C14), palmitic acid (C16), stearic acid (C18), isostearic acid (C18), docosahexaenoic acid (C22), behenic acid (C21), undecylenic acid (C11), oleic acid (C18), erucic acid (C22), linoleic acid (C18), arachidonic acid (C20), linolenic acid (C18), and sapienic acid (C16). The carboxylic acid may be used alone or in combination of two or more.

The carboxylic acid constituting a carboxylic acid metal salt in the component (C) are preferable to be a carboxylic acid having a straight-chain hydrocarbon group (straight-chain fat group carboxylic acid), from the viewpoint of good compatibility with a straight-chain saturated hydrocarbon compound and a carboxylic acid. The number of carbon atoms of the carboxylic acid constituting a carboxylic acid metal salt is preferable to be 6 or more, such as 6 to 30, 6 to 25, or 8 to 20. The carboxylic acid constituting a carboxylic acid metal salt may be saturated or unsaturated. The metal constituting a carboxylic acid metal salt is a metal capable of forming salts with a carboxylic acid, and an example thereof is aluminum. Specific examples of the carboxylic acid metal salt include aluminum stearate (C18 (number of carbon atoms, the same applies below)), aluminum laurate (C12), aluminum oleate (C18), aluminum behenate (C21), aluminum palmitate (C16), and aluminum 2-ethylhexanoate (C8). The carboxylic acid metal salt may be used alone or in combination of two or more.

When the resin member 1 contains the component (C), the content of the component (C) is preferably 3% by mass or more, and is preferably 10% by mass or less, more preferably 8% by mass or less, and furthermore preferably 6% by mass or less, based on the total amount of the resin member.

The resin member 1 may further include a polymer having a melting point of 100° C. or more (hereinafter also referred to as "component (D)"). The component (D) is a component other than a copolymer of ethylene and an olefin having 3 or more carbon atoms (component (A)). The resin member 1 includes the component (D), and thereby formation of a physical inter-network structure can be expected and the resin member 1 is excellent in suppressing flowability and maintaining the shape at a high temperature (for example, 50° C. or more).

The melting point of the component (D) may be 100° C. or more, 120° C. or more, or 140° C. or more. The melting point of the component (D) may be 250° C. or less, 230° C. or less, or 200° C. or less.

The component (D) is desirable to have good compatibility with the component (A) and the component (B). The component (D) may be a linear polymer, a branched polymer, a modified polymer, a copolymer, or the like. The component (D) may be, for example, polyethylene (ethylene homopolymer), polypropylene (propylene homopolymer), or the like, a modified polymer of polyethylene or polypropylene which includes monomer units other than ethylene or propylene, and a copolymer of ethylene or propylene and another monomer. The copolymer may be, for example, a block copolymer. The component (D) may be used alone or in combination of two or more.

When the melting point of the component (B) is 50° C. or more, the resin member 1 preferably further includes at least one selected from the group consisting of polyethylene (ethylene homopolymer) and polypropylene (propylene homopolymer) as the component (D), from the viewpoint of the resin member 1 being further superior in suppressing flowability and maintaining the shape in the temperature range of 50° C. or more.

When the resin member 1 includes the component (D), the content of the component (D) is preferably 5% by mass or more, preferably 30% by mass or less, more preferably 25% by mass or less, and furthermore preferably 20% by mass or less, based on the total amount of the resin member.

The resin member 1 may further include other components in addition to the above components (A) to (D). Examples of the other components include inorganic components such as glass and talc, and light absorbing agents for suppressing photodegradation. The content of the other components is preferable to be, for example, 10% by mass or less, based on the total amount of the resin member.

The resin member 1 described above can be obtained, for example, by the following method. In the condition that the straight-chain saturated hydrocarbon compound (component (B)) is heated to a temperature higher than the melting point, a copolymer (component (A)) of ethylene and an olefin having 3 or more carbon atoms and, if necessary, a polymer having a melting point of 100° C. or more (component (D)) are added and mixed. After homogeneously mixing, a carboxylic acid and a carboxylic acid metal salt (component (C)) are added, if necessary, and further homogeneously mixed to obtain the resin member 1.

As described above, since the resin member 1 can store heat or dissipate heat by utilizing phase transition, it is preferably used as a heat storage material. In this specification, "resin member" can be read as "heat storage material". The heat storage material according to one embodiment includes a copolymer of ethylene and an olefin having 3 or more carbon atoms, and a straight-chain saturated hydrocarbon compound.

The heat storage material (resin member) of the present embodiment can be utilized in various fields. The heat storage material (resin member) is used for, for example, air-conditioning equipment in automobiles, buildings, public facilities, underground malls, and the like; automobile engines (heat insulation around the engines); electronic components (prevention of temperature rise of electronic components); underwear fibers; and the like. Since the heat storage material (resin member) does not need a casing and the heat storage material (resin member) alone has excellent strength (in particular, tensile strength), it can be pasted to, wound around, or attached in various conditions to the object to be attached.

Figure 2:
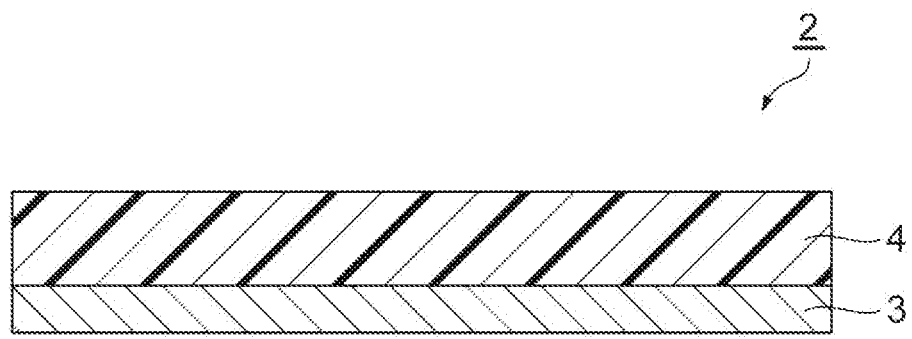
FIG. 2 is a schematic cross-sectional view showing one embodiment of a sheet using the resin member.

FIG. 2 is a schematic cross-sectional view showing one embodiment of a sheet using the resin member. As shown in FIG. 2, the sheet 2 comprises the metal layer 3 and the resin layer 4 formed on the metal layer 3.

The metal layer 3 is composed of, for example, aluminum, copper, or the like. The thickness of the metal layer 3 is, for example, 100 μm or less.

The resin layer 4 is composed of the resin member (heat storage material) 1 described above. The thickness of the resin layer 4 is, for example, 1 to 30 mm, 2 to 20 mm, or 5 to 10 mm.

The sheet 2 is obtained, for example, by pressure lamination of the resin member 1 and the metal layer 3. In this case, if necessary, heating may be performed at the temperature or less at which the resin member 1 is held in shape.

When the sheet 2 according to the present embodiment includes, for example, n-hexadecane as a straight-chain saturated hydrocarbon compound, the sheet 2 is a sheet having high reflectance of sunlight at high temperature (for example, 20° C. or more) and low reflectance of sunlight at low temperature (for example, 15° C. or less). The sheet 2 is used for, for example, a roof, a road, and the like. The sheet 2 is laid on a roof, a road, or the like, and thereby the resin layer 4 becomes transparent as the straight-chain hydrocarbon compound becomes a liquid state at high temperature (for example, in the summer), and the metal layer 3 reflects the solar heat, allowing the sheet 2 to suppress temperature rise of roofs, roads, and the like. Meanwhile, at low temperature (for example, in the winter), the resin layer 4 becomes opaque because the straight-chain hydrocarbon compound becomes solid or semi-solid. In this case, the metal layer 3 does not reflect the solar heat, the resin layer 4 absorbs heat, and the temperature decrease of the roof, road, and the like is suppressed. That is, the sheet 2 according to the present embodiment can achieve temperature rise suppression at high temperature and suppression of temperature drop at low temperature, and is utilized as an auxiliary function of the air conditioner.

As described above, since the sheet 2 can suppress temperature rise at high temperature and suppress temperature decrease at low temperature, it is preferably used as a heat control sheet. In the above description, "sheet" can be read as "thermal control sheet". The thermal control sheet according to the present embodiment comprises a metal layer and a heat storage layer formed on the metal layer and consisting of a heat storage material.

EXAMPLES

The present invention will be specifically described based on examples, but the present invention is not limited to these Examples.

In Examples and Comparative Examples, each of the components salt as described below was used to prepare the resin member having the composition shown in Table 1. In the condition that the straight-chain saturated hydrocarbon compound was heated to a temperature higher than the melting point, a copolymer of ethylene and an olefin having 3 or more carbon atoms were added and mixed. After homogeneously mixing, a carboxylic acid and a carboxylic acid metal salt were added and further homogeneously mixed to obtain the resin member.

(Copolymer of Ethylene and Olefin Having 3 or More Carbon Atoms)

A-1: Copolymer of ethylene and octene (product name "ENGAGE8150" manufactured by Dow Chemical Japan, Ltd.)

A-2: Copolymer of ethylene and propylene (product name "Esprene V141" manufactured by Sumitomo Chemical Co., Ltd.)

a-1: Hydrogenated diene-based copolymer (product name "DYNARON CEBC 6200P" manufactured by JSR CO., Ltd.)

(Straight-Chain Saturated Hydrocarbon Compound)
B-1: n-hexadecane (melting point: 18° C.)
B-2: n-pentadecane (melting point: 9° C.)
B-3: HNP-9 (paraffin wax manufactured by Nippon Seiro Co., Ltd., melting point: 74 to 76° C.)
(Carboxylic Acid or Carboxylic Acid Metal Salt)
C-1: Oleic acid
C-2: Aluminum 2-ethylhexanoate The melting point of the straight-chain saturated hydrocarbon compound was calculated from the peak temperature of melting in a temperature rising process at a temperature rising rate of 10° C./min by differential thermal analysis (DSC).
(Measurement of Breaking Distortion)

Figure 3:
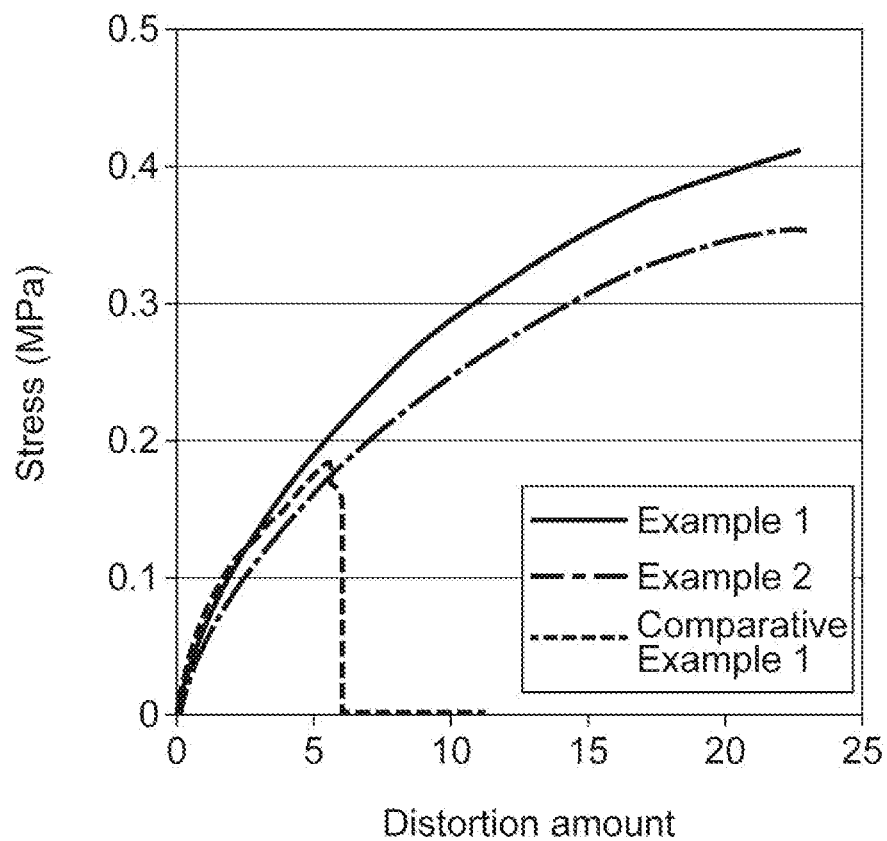
FIG. 3 is a graph showing the measurement results of breaking distortion in Examples.

With respect to each of Examples and Comparative Examples, a resin member having a size of 30 mm×5 mm×1 mm was used as a sample, and the sample was pulled using a tensile tester under the condition of 25° C., a chuck distance of 10 mm, and a pulling rate of 500 mm/min, and then the distortion amount (%) from initial to breaking was measured. The results are shown in Table 1. The results of Examples 1 and 2 and Comparative Example 3 are shown in FIG. 3 as well.
(Measurement of Heat of Fusion)

With respect to the obtained resin member, the heat of fusion (J/g) was calculated from the peak area of melting in the temperature rising process at a temperature rising rate of 10° C./min by differential thermal analysis (DSC). The results are shown in Table 1.
(Measurement of Shape Holding Temperature)

The sample (the resin member) was placed on a hot plate and the temperature was raised from 30° C. in interval of 5° C. (temperature rising rate: about 5° C./min), and the temperature (° C.) at which shape change started was measured. The measurement results are shown in Table 1.

a temperature more than the melting point, and the reflection of sunlight can be expected to be suppressed at a temperature less than or equal to the melting point.

REFERENCE SIGNS LIST

1: resin member, 2: sheet, 3: metal layer, 4: resin layer.

The invention claimed is:
1. A resin member comprising:
a copolymer of ethylene and an olefin having 8 carbon atoms;
a straight-chain saturated hydrocarbon compound, wherein a melting point of the straight-chain saturated hydrocarbon compound is less than 50° C.; and
a polymer having a melting point of 100° C. or more.
2. A sheet comprising:
a metal layer; and
a resin layer formed on the metal layer and composed of the resin member according to claim 1.
3. A heat storage material comprising:
a copolymer of ethylene and an olefin having 8 carbon atoms;
a straight-chain saturated hydrocarbon compound, wherein a melting point of the straight-chain saturated hydrocarbon compound is less than 50° C.; and
a polymer having a melting point of 100° C. or more.
4. A heat control sheet comprising:
a metal layer; and
a heat storage layer formed on the metal layer and composed of the heat storage material according to claim 3.
5. The resin member according to claim 1, wherein the straight-chain saturated hydrocarbon compound comprises n-tetradecane, n-pentadecane, n-hexadecane, n-heptade-

TABLE 1

| | | Example 1 | Example 2 | Example 3 | Example 4 | Comparative Example 1 | Comparative Example 2 | Comparative Example 3 |
|---|---|---|---|---|---|---|---|---|
| Composition (% by mass) | A-1 | 30 | 30 | 28 | 28 | — | — | — |
| | A-2 | — | — | — | — | — | — | — |
| | a-1 | — | — | — | — | — | — | 30 |
| | B-1 | 70 | — | 67 | — | 93 | — | 70 |
| | B-2 | — | 70 | — | 67 | — | — | — |
| | B-3 | — | — | — | — | — | 100 | — |
| | C-1 | — | — | 2 | 2 | 2 | — | — |
| | C-2 | — | — | 3 | 3 | 5 | — | — |
| Breaking distortion (%) | | >2000 | >2000 | >2000 | >2000 | Not measurable | Not measurable | 550 |
| Heat of fusion of resin member (J/g) | | 138 | 108 | 135 | 123 | 201 | 212 | 121 |
| Shape holding temperature (° C.) | | 65 | 60 | 65 | 65 | <30 | Liquid | 75 |

Example 7

With respect to the film-like resin member having the composition in Example 3, the states at a temperature less than or equal to the melting point and a temperature more than the melting point of the straight-chain saturated hydrocarbon compound were confirmed. As a result, it became a transparent state at a temperature more than the melting point, and at a temperature less than or equal to the melting point, since hexadecane, which is a straight-chain saturated hydrocarbon compound, was crystallized, it became a white state. From this, combining the film-like resin member and a metal layer such as an aluminum foil makes it effective that the metal layer such as an aluminum foil reflects sunlight at cane, n-octadecane, n-nanodecane, n-eicosane, n-heneicosane, n-docosane, or n-tricosane.
6. The resin member according to claim 1, wherein the polymer having a melting point of 100° C. or more comprises one or more of polyethylene (ethylene homopolymer), polypropylene (propylene homopolymer), a modified polymer of polyethylene or polypropylene that includes monomer units other than ethylene or propylene, or a copolymer of ethylene or propylene and another monomer.
7. The heat storage material according to claim 3, wherein the straight-chain saturated hydrocarbon compound comprises n-tetradecane, n-pentadecane, n-hexadecane, n-heptadecane, n-octadecane, n-nanodecane, n-eicosane, n-heneicosane, n-docosane, or n-tricosane.

8. The heat storage material according to claim 3, wherein the polymer having a melting point of 100° C. or more comprises one or more of polyethylene (ethylene homopolymer), polypropylene (propylene homopolymer), a modified polymer of polyethylene or polypropylene that includes monomer units other than ethylene or propylene, or a copolymer of ethylene or propylene and another monomer.

* * * * *